Jan. 12, 1965   W. H. McCORKLE ETAL   3,165,448
NUCLEAR REACTOR CORE AND FUEL ASSEMBLY
Original Filed Nov. 8, 1960   8 Sheets-Sheet 1

INVENTORS
Willard H. McCorkle
Harry S. Cern
By:
Attorney

Jan. 12, 1965 W. H. McCORKLE ETAL 3,165,448
NUCLEAR REACTOR CORE AND FUEL ASSEMBLY
Original Filed Nov. 8, 1960 8 Sheets-Sheet 4

INVENTOR.
Willard H. McCorkle
Harry S. Cerr
BY

Attorney

Jan. 12, 1965   W. H. McCORKLE ETAL   3,165,448
NUCLEAR REACTOR CORE AND FUEL ASSEMBLY
Original Filed Nov. 8, 1960   8 Sheets-Sheet 8

INVENTORS
Willard H. McCorkle
Harry S. Cerf
BY

Attorney

United States Patent Office 3,165,448
Patented Jan. 12, 1965

3,165,448
NUCLEAR REACTOR CORE AND FUEL
ASSEMBLY
Willard H. McCorkle, Hinsdale, and Harry S. Cern, Chicago, Ill., assignors to the United States of America as represented by the United States Atomic Energy Commission
Original application Nov. 8, 1960, Ser. No. 68,140, now Patent No. 3,031,394, dated Apr. 24, 1962. Divided and this application Mar. 16, 1962, Ser. No. 180,366
3 Claims. (Cl. 176—59)

This is a divisional application of application Serial No. 68,140, filed on November 8, 1960, now United States Patent No. 3,031,394, issued April 24, 1962.

This invention relates to a facility for irradiating biological specimens. In more detail the invention relates to a research reactor which is designed so that experiments on biological specimens involving both high-level and low-level exposure to fission energy neutrons can be carried out simultaneously. In a more limited aspect the invention relates to a novel fuel element including a photoneutron source and a burnable poison element and to a core incorporating the novel fuel element.

If man is to survive in the nuclear era, he must know more about the biological effects of radiation damage. This information, in part at least, must come from studies of animals exposed to very low levels of radiation for long periods of time. Some areas of immediate interest are: (a) the effects of prolonged low-level exposure on longevity and fertility, (b) the genetic effects of chronic versus acute exposures, (c) the effects of low-level radiation on disease resistance, cataract formation, and cancer incidence, (d) the effects of low-level exposures on animal behavior, including general activity and work production, (e) the recovery rates following exposures, and (f) a determination of the relation of the parameters of radiation to cause of death.

Low-level experiments involving long periods of time can only be carried out in a reactor operated at a constant power level since changing the power level of a reactor affects the radiation level at all locations in the reactor. It is, of course, desirable that the utility of the reactor not be restricted to these low-level experiments important as they are. It is therefore desirable that the reactor also be available for high-level experiments of short duration. Furthermore as much flexibility in these experiments as can be obtained consistent with the requirement for a constant power level is desirable.

The information that is desired to be obtained from these experiments is the effect of fission energy neutrons on biological specimens since uncontrolled chain reactions give rise to fission energy neutrons. Since a reactor does not supply fission energy neutrons at any great distance from the core, means must be provided for converting the thermal neutrons available at the edge of the core to fission energy neutrons. The arrangement whereby this result is accomplished is described in detail hereinafter.

Other desirable features of the present invention will be apparent as this description proceeds.

It is accordingly an object of the present invention to develop a biological irradiation facility within which experiments involving both high-level and low-level exposure to neutrons can be carried on at the same time.

It is also an object of the present invention to develop a nuclear reactor that can be operated for long periods of time at a fixed power level so that long-term low-level experiments can be carried out and wherein high-level experiments can be simultaneously carried out.

It is a further object of the present invention to develop a nuclear reactor providing fission energy neutrons simultaneously at a low level in a chronic exposure room and at a high level in an acute exposure room.

One more object of the present invention is to develop a biological research reactor having the greatest flexibility possible consistent with its use for long-term, low-level experiments.

It is also an object of the present invention to develop a novel fuel element which includes a photoneutron source and a burnable-poison element.

These and other objects of the present invention are attained in a facility for irradiating biological specimens with neutrons comprising a nuclear reactor and high- and low-exposure rooms located on opposite sides of the reactor, the reactor being constructed and arranged to direct a low neutron flux into the low-exposure room and a much higher neutron flux into the high-exposure room.

The nuclear reactor comprises a highly-enriched, heterogeneous, thermal core which is cooled by water and is located off center in the direction of the high-exposure room in a reactor vessel filled with water. The reactor vessel is in turn located off center in the direction of the high-exposure room in a mass of graphite serving as reflector. Means are provided between the core and the exposure rooms for converting thermal neutrons to fast neutrons, for cutting off the beam of neutrons entirely, and for shielding the exposure rooms from gamma rays.

In addition to the above features, the invention also includes details of the reactor core and the fuel elements as described hereinafter.

The invention will next be described in connection with the accompanying drawings wherein:

FIG. 7 is a horizontal sectional view through the reactor core taken on line 7—7 of FIG. 6;

Figures 1, 15:
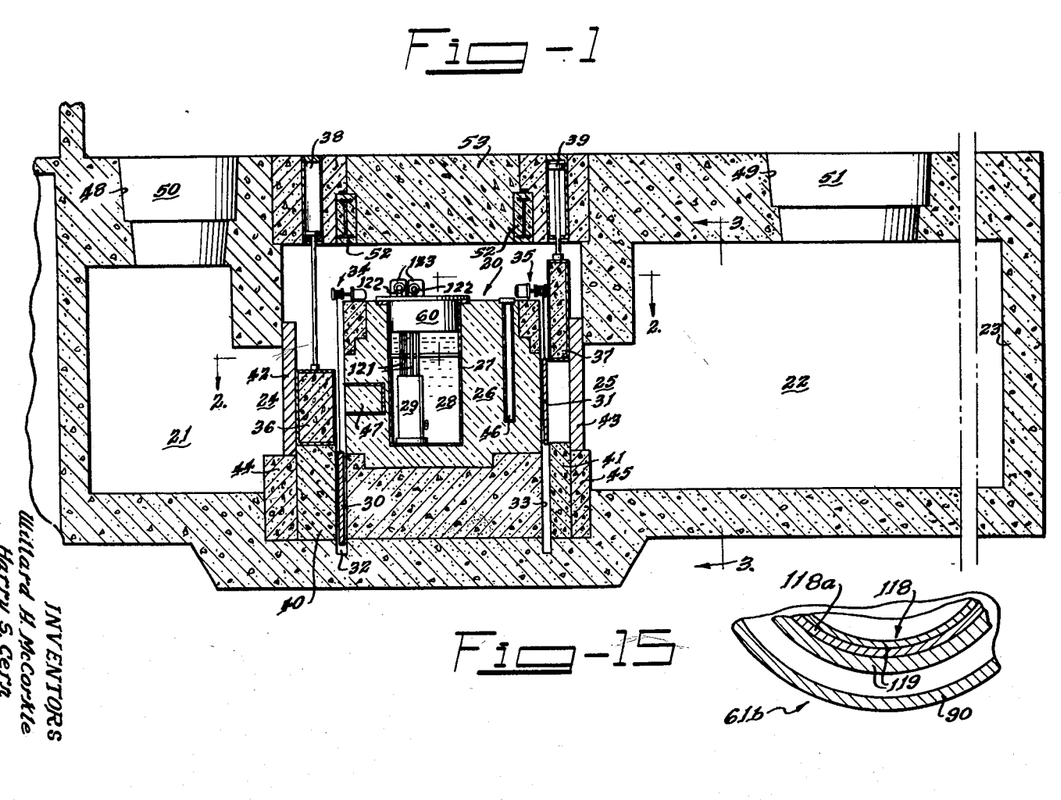
FIG. 1 is a vertical sectional view of a neutron-irradiation facility according to the present invention.
FIG. 15 is a partial horizontal sectional view taken on line 15—15 of FIG. 13.

Referring now to FIG. 1, the neutron-irradiation facility according to the present invention comprises a nuclear reactor 20 having a high-exposure room 21 and a low-exposure room 22 at opposite sides thereof. The entire neutron-irradiation facility is shielded by conventional massive shielding 23. Nuclear reactor 20 is also shielded from high- and low-exposure rooms 21 and 22 except at apertures 24 and 25, respectively. Nuclear reactor 20 comprises a graphite reflector 26, an aluminum reactor vessel 27 disposed in the graphite reflector 26 off center in the direction of the high-exposure room 21, said reactor vessel being filled with a body of light water 28, and a nuclear reactor core 29 disposed in the reactor vessel 27 off center in the direction of the high-exposure room 21. Neutron converters 30 and 31 are so disposed that they can be moved into position in front of apertures 24 and 25 or dropped into shielded pockets 32 and 33 by means of lifting mechanisms 34 and 35. Neutron shutters 36 and 37 are also movably positioned so that they can be positioned in front of apertures 24 and 25, respectively, or lifted away therefrom by pneumatic lifting mechanisms 38 and 39. When in position in front of apertures 24 and 25, shutters 36 and 37 rest on pedestals 40 and 41, respectively. Lead gamma shields 42 and 43, respectively, are also disposed so as to close apertures 24 and 25 and rest on pedestals 44 and 45. An attenuation chamber 46 is provided in the graphite reflector 26 on the low-exposure-room side of the core and a removable block of graphite 47, 16 inches x 16 inches in cross section, extending inwardly from the face of the reflector 26 almost to the reactor core is located in the graphite reflector 26 on the high-exposure-room side of the core. Converters 30 and 31, shutters 36 and 37, attenuation chamber 46 and block 47 will all be described in more detail hereinafter. Access ports 48 and 49, provided with access plugs 50 and 51, are provided for the high- and low-exposure rooms 21 and 22, respectively. Concrete-encased steel beams 52 support segments 53 which form the core access portion of the top shield. There are six segments 53 and one or more of these may be removed for access to the core.

Figure 2:
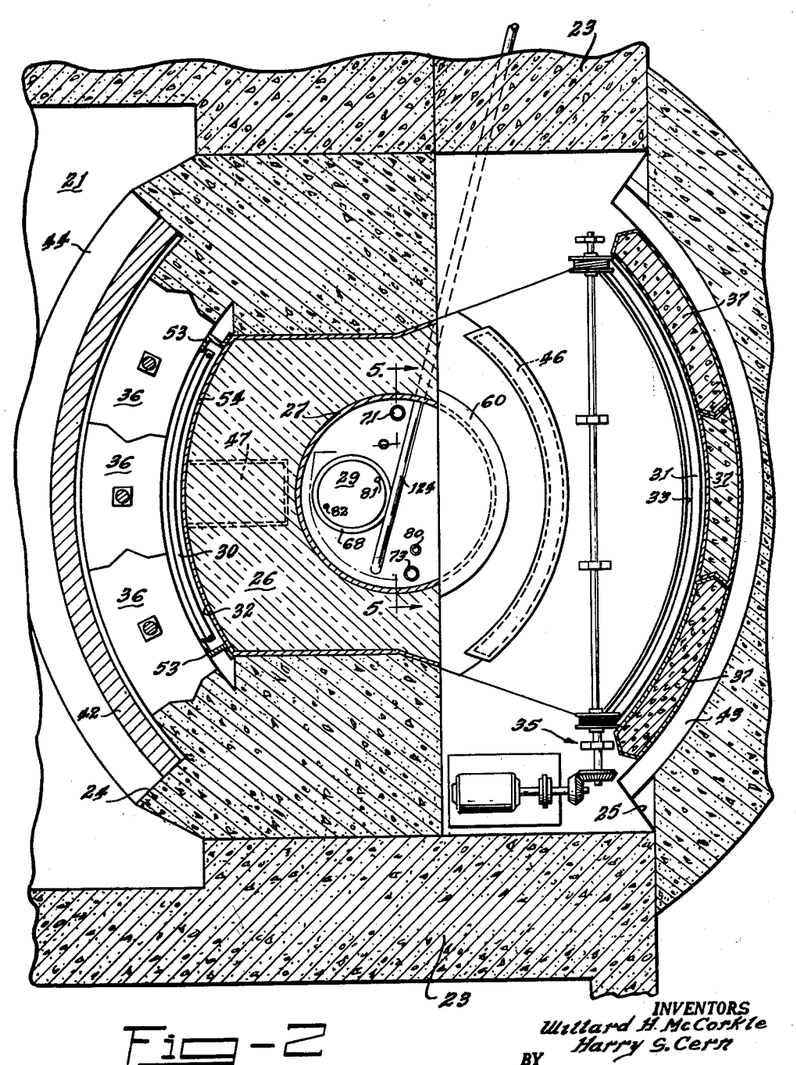

Referring now to FIG. 2, it will be seen that the edges of the graphite reflector 26 which face the high- and low-exposure rooms 21 and 22 are arcuate in shape and are centered about a common axis. The face on the side of the low-exposure room 22 has a longer radius than the face on the side of the high-exposure room and subtends a greater angle than the face having the shorter radius. The radius of the face on the side of the low-exposure room is 80 inches and the radius of the face on the side of the high-exposure room is 66 inches. The distance between the reactor vessel 27 and the face of the graphite reflector 26 at their closest approach is 46 inches on the low-exposure side and 28 inches on the high-exposure side. Converters 30 and 31 are arcuate in form and conform very closely to the faces of the reflector 26. Converters 30 and 31 are raised and lowered by lifting mechanisms 34 and 35 attached to the ends thereof. Likewise shutters 36 and 37 are arcuate in form and conform very closely to the faces of the reflector 26. Shutters 36 and 37 are each separated into three sections, each of which is separately movable by lifting mechanisms 38 and 39. The particular arrangement of graphite in reflector 26 insures a uniform neutron spectra over the two converters 30 and 31 even though the converters cover a large solid angle about the core 29. Converter 31 is wider than converter 30 because low-level-exposure room 22 is larger than high-level-exposure room 21 to accommodate a large number of long-term experiments. Also seen in FIG. 2 are guides 53 for converters 30 and 31 and gas-tight steel vessel 54 which encloses reflector 26.

Figure 3:
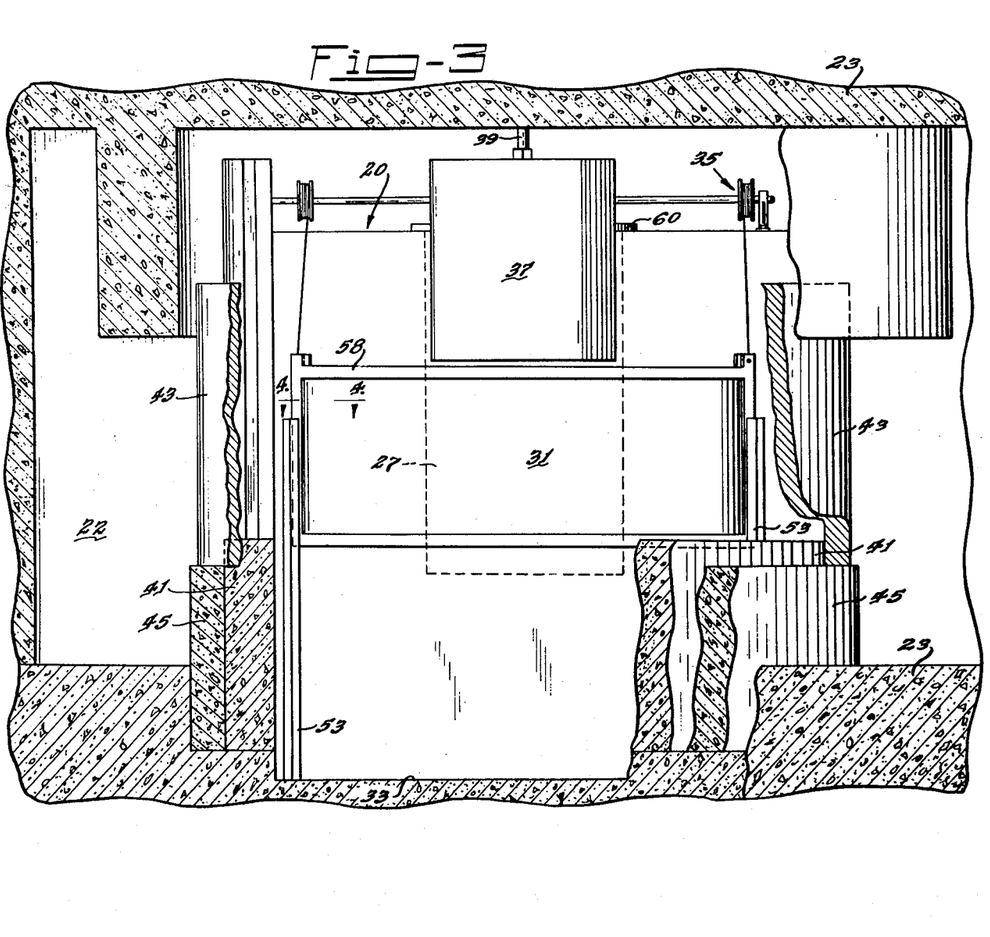
FIG. 3 is a front elevational view of the reactor with parts broken away taken on the line 3—3 of FIG. 1.

FIG. 3 illustrates the relative positions of the converters, shutters and lead shield. For purposes of clarifying the illustration only one of the three sections of the neutron shutter 37 is shown in this figure.

Figure 4:
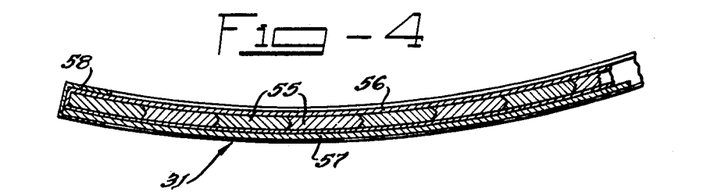
FIG. 4 is a detailed sectional view taken on line 4—4 of FIG. 3.

Reference will now be made to FIG. 4 to illustrate the specific construction of converters 30 and 31. The converters are formed of flat strips 55 of a mixture of about 93% enriched uranium and aluminum. They may be formed of $U_3O_8$ mixed with aluminum powder or, alternatively, of an alloy or other mixture of metallic uranium and aluminum. As shown, the strips are fabricated with a male and a female groove on respective edges. The strips are inserted in aluminum frame 56 with the grooves of neighboring strips mating. The flat strips are each about ½ inch thick, 38 inches tall and 4 inches wide and contain about 9% uranium. A boral shield 57, ¼ inch thick, is located against the convex side of the converters 30 and 31. These assemblies are mounted in a steel frame 58. The effective area of the high-level converter 30 is 37 inches by 74⅜ inches while the effective area of low-level converter 31 is 37 inches by 117 11/16 inches. Thermal neutrons which have not been captured in the converters will be essentially eliminated by the sheets of boral 57.

Figure 5:
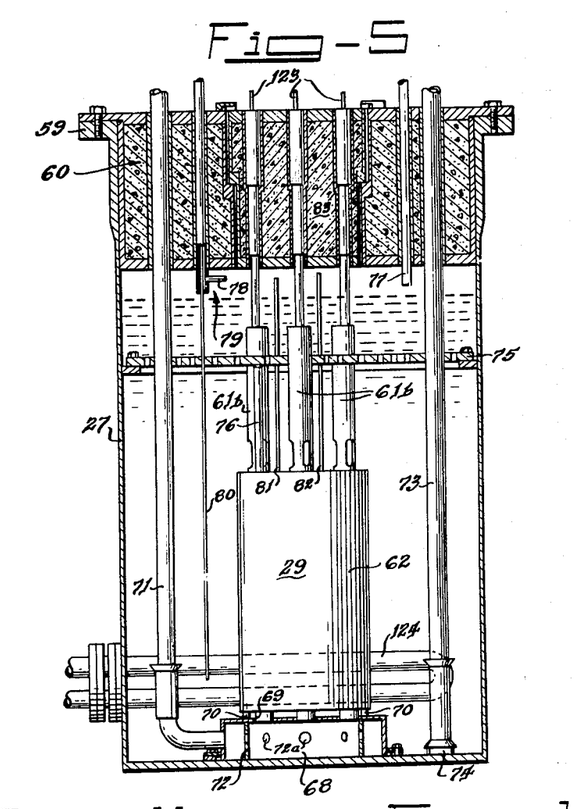
FIG. 5 is a vertical sectional view through the reactor taken on line 5—5 of FIG. 2.
Figure 6:
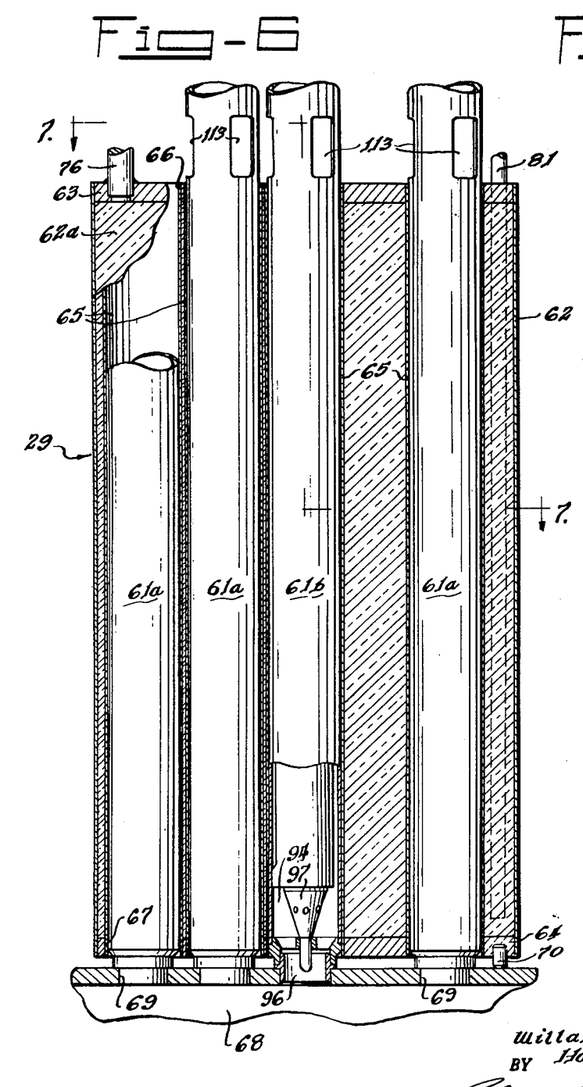
FIG. 6 is a vertical sectional view through the reactor core taken on line 6—6 of FIG. 7.
Figure 7:
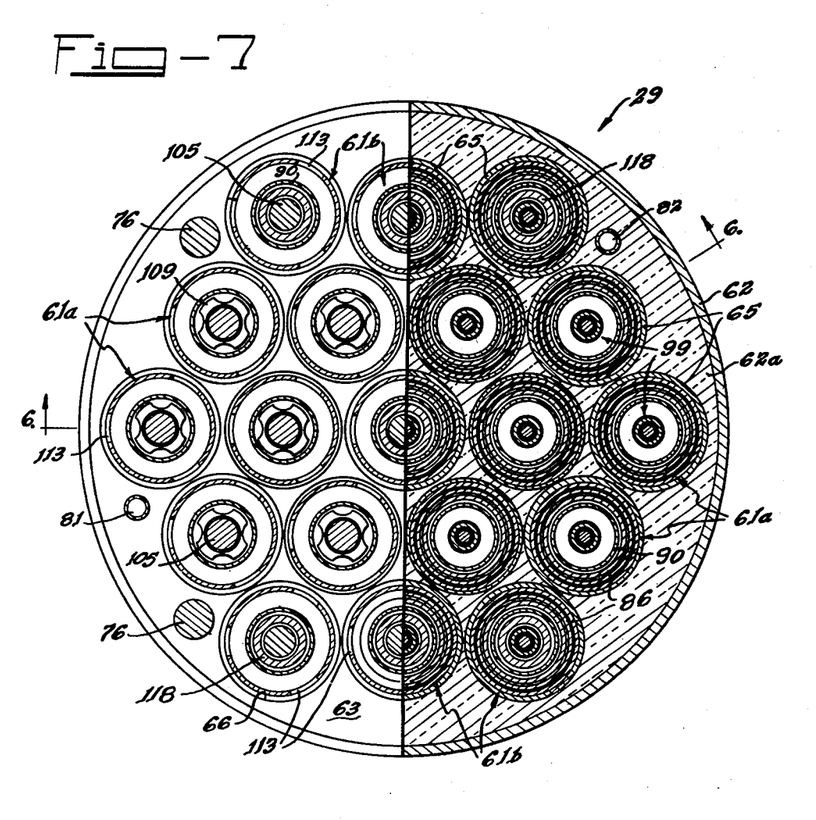
FIG. 7 is a horizontal sectional view through the reactor forming a part of the neutron-irradiation facility taken on the line 2—2 of FIG. 1.
Figure 8:
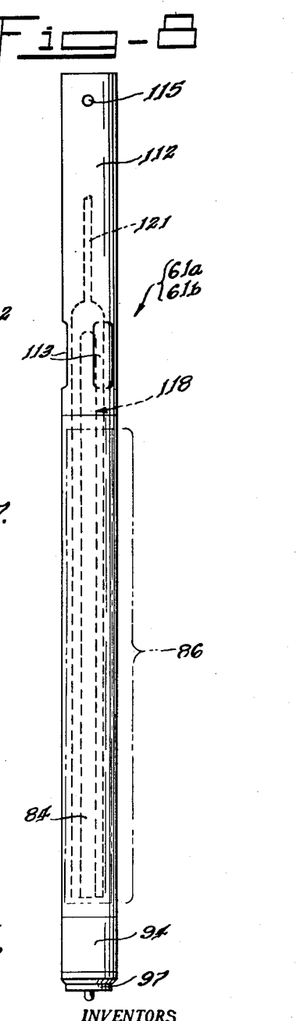
FIG. 8 is an elevational view of a typical fuel and control assembly.

Reference will now be made to FIGS. 5, 6 and 7 for details of the reactor vessel and reactor core. Reactor vessel 27 is 48⅜ inches O.D. and 84 inches tall. The wall is approximately ½ inch thick. The bottom is approximately 1 inch thick. A reinforced flange 59 at the top thereof supports a shielding cover 60 which is 21 inches in thickness and is made of stainless steel filled with a hydrogenous mixture containing boron and lead. The reactor core 29 contains positions for 19 tubular assemblies including 12 fuel assemblies 61a and seven fuel and cnotrol assemblies 61b. As used hereinafter, the number 61 denotes both assemblies 61a and 61b. These assemblies are arranged in three concentric rings about a single assembly at the axis of the group. The axis of the core 29 is placed 10½ inches off the axis of the reactor vessel 27 in the direction toward the high-level-exposure room 21. The inner or first ring has a diameter of 6 11/16 inches. Six fuel assemblies may be centered and spaced 30° apart on this ring. The diameter of the second ring, upon which six additional fuel assemblies may be centered and spaced 30° apart, is 11½ inches. The third ring also accommodates six fuel assemblies spaced 30° apart on a circle which is 13⅜ inches in diameter. This arrangement places the centers of the fuel assemblies 3.343 inches from each other except for those of the first ring which are seen to be spaced 3.309 inches from those in the second ring.

A drum 62 embraces the assemblies 61a and 61b in the reactor core 29 and has an outside diameter of 17.5 inches. Drum 62 is provided with top and bottom plates 63 and 64, respectively, which are ¾ inch thick. The total length of the drum is 31.5 inches. Nineteen aluminum tubes 65, 3 3/16 inches O.D. with 1/32-inch thick walls, are welded into matching holes 66 and 67, respectively, in the top and bottom plates 63 and 64. These holes are so spaced as to accommodate the fuel assemblies 61a and b. A plenum chamber 68 attached to the bottom of the reactor vessel 27 is provided with openings 69 matching those in the top and bottom plates 63 and 64 of drum 62. Bottom plate 64 is held ½ inch above the top of plenum chamber 68 by pads 70. The vacant space in drum 62 between fuel assemblies 61 is completely filled with small graphite spheres 62a about 1/16 inch in diameter. A water inlet pipe 71 extends through shielding cover 60 and terminates in plenum chamber 68. Plenum chamber 68 is provided with an annular baffle 72 having openings 72a to obtain uniform flow through the fuel assemblies 61. A water outlet pipe 73 also extends through shielding cover 60 and has an inlet 74 near the bottom of reactor vessel 27. A perforated grid plate 75 is provided in the reactor vessel 27 and is supported from drum 62 by supports 76. The reactor vessel 27 is slightly pressurized by helium. This is introduced thereinto by gas inlet pipe 77 and exits through gas outlet pipe 78. Gas outlet pipe 78 forms a part of a water level bubbler system 79 including a small tube 80 extending nearly to the bottom of reactor vessel 27. The amount of water in the reactor vessel 27 may be determined by the bubbler system 79. The drum 62 is also pressurized with helium to a pressure of about 5 p.s.i.g. by means of inlet and outlet pipes 81 and 82, respectively. A large rotatable plug 83 is mounted in the shielding cover 60 over core 29. Single access openings are provided in this rotatable plug for each ring of assemblies 61 in the reactor core 29. By this means, a single access opening may be used to service a number of fuel assemblies so that the number of openings in the shielding cover is reduced. When the rotatable plug 83 is to be employed, the control rods are disconnected.

Fuel assemblies 61a will next be described, referring to FIGS. 9 through 12. Each fuel assembly is comprised of three coaxial fuel tubes 84 which are joined at lobes 84a to form a fuel tube bundle 86. Each of the fuel tubes has an inner and outer jacket 87 of 1100 aluminum which is 0.015 inch thick. The fuel, which is an alloy of aluminum and uranium enriched in the $U^{235}$ isotope to 93%, has for all fuel tubes a nominal length of $25^{13}/_{16}$ inches. The outer fuel tube is 3.000 inches O.D. with a 0.050-inch wall thickness. The fuel, containing 34.55 grams of $U^{235}$ for this tube, is 0.020 inch thick. The intermediate fuel tube is 2.640 inches O.D. with a wall thickness of 0.062 inch, and fuel thickness of 0.032 inch. This fuel tube contains 77 grams of $U^{235}$. The inner fuel tube, containing 64 grams of $U^{235}$, is 2.236 inches O.D. with a wall thickness of 0.062 inch and fuel thickness of 0.032 inch. The following table gives the volumes and masses of constituents in the fuel tubes.

*Outer Fuel Tube*

| | |
|---|---|
| Volume of Al ____________________cm.$^3$ (ml.)__ | 217.0 |
| Volume of U _____________________cm.$^3$__ | ~2.0 |
| Mass of Al ______________________gms__ | 588.0 |
| Mass of $U^{235}$ __________________gms__ | 34.55 |

*Intermediate Fuel Tube*

| | |
|---|---|
| Volume of Al ____________________ cm.$^3$ (ml.)__ | 219.1 |
| Volume of U _____________________cm.$^3$__ | ~4.5 |
| Mass of Al ______________________gms__ | 594.0 |
| Mass of $U^{235}$ __________________gms__ | 77.0 |

*Inner Fuel Tube*

| | |
|---|---|
| Volume of Al ____________________cm.$^3$ (ml.)__ | 184.2 |
| Volume of U _____________________cm.$^3$__ | ~3.7 |
| Mass of Al ______________________gms__ | 499.2 |
| Mass of $U^{235}$ __________________gms__ | 64.0 |

Annular channels 88 between the fuel tubes 84 provide space for circulation of water between the fuel tubes. The channel 88 between the outer and intermediate fuel tubes 84 is 0.130 inch thick and that between the intermediate and inner fuel tubes is 0.140 inch thick. Another annular channel 89, 0.149 inch thick, separates inner fuel tube 84 from a 0.062-inch thick aluminum thimble 90 which is 1.814 inches in diameter. Reactor water is also circulated through channel 89. A hollow beryllium cylinder 91, 24.0 inches long and 0.897 inch O.D. with a 0.255-inch thick wall encased in a 0.049-inch thick aluminum jacket 92, is mounted on the axis of the fuel assembly 61. At the center of the beryllium cylinder 91 a small poison rod 93 of boron and aluminum encased in an aluminum jacket 93a is provided as a burnable poison. Poison rod 93 is 0.25 inch O.D. including 0.049-inch thick cladding 93a. The mass of aluminum therein is 57.2 grams and the mass of boron is between 0.10 gram and 0.20 gram. Burnup of the boron in the poison rod will tend to compensate for the decrease of reactivity occasioned by fuel burnup and fission product poisoning.

Figure 9:
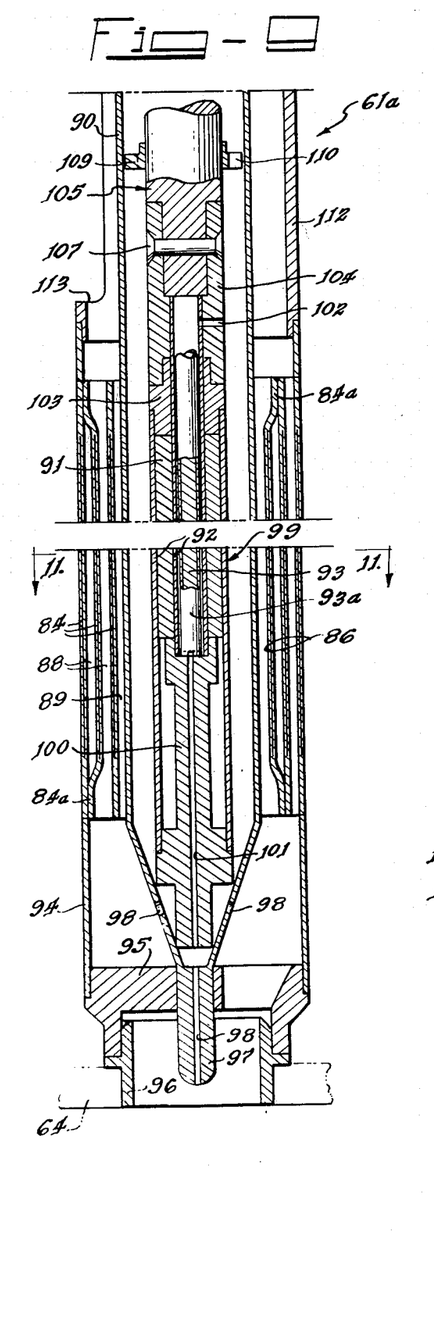
FIG. 9 is a vertical sectional view of the lower portion of a fuel assembly.

Fuel assemblies 61 are positioned over openings 69 in plenum chamber 68. A lower extension member 94 connects fuel tubes 84 to a spider 95 which fits over a nozzle 96 located in openings 69 in plenum chamber 68. Thimble 90 is provided with an elongated cylindrical tip 97 which seats in spider 95 and extends down into nozzle 96. Apertures 98 in tip 97 permit the circulation of water through thimble 90.

Figure 10:
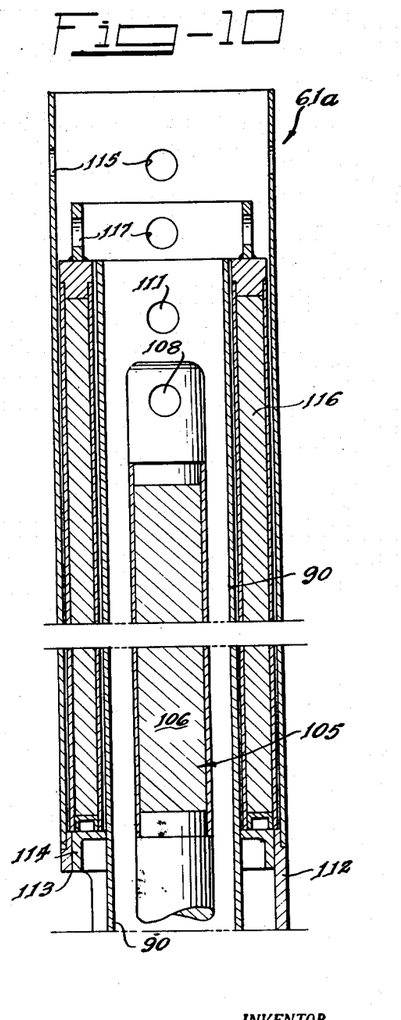
FIG. 10 is a vertical sectional view of an upper portion of a fuel assembly.
Figure 11:
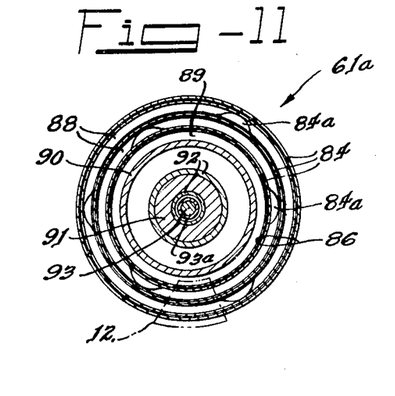
FIG. 11 is a horizontal sectional view taken on line 11—11 of FIG. 9.
Figure 12:
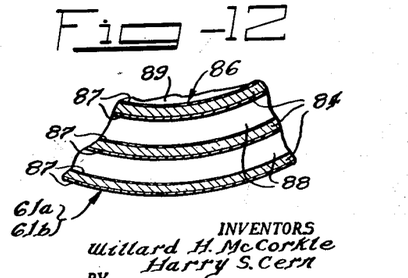
FIG. 12 is a detailed view of a portion of the fuel element shown in FIG. 11.

Beryllium cylinder 91 and poison rod 93 are contained within an assembly 99 consisting of a lower support member 100 having an opening 101 therethrough extending into the interior of the beryllium cylinder 91. Cooling water passes upwardly through opening 101 past poison rod 93 through beryllium cylinder 91 to outlet opening 102. At its upper end assembly 99 comprises a cap 103 for the beryllium cylinder 91 and a connector 104. An upper extension 105 containing a mass of lead 106 to serve as a weight is attached to connector 104 by a rivet 107. At its top, assembly 99 is provided with handling openings 108. Assembly 99 is maintained in spaced relationship to thimble 90 by a spacer member 109 having an opening 110 therein. Thimble 90 is also provided with a handling opening 111. Fuel tube extension 112, having an outlet opening 113, has attached thereto a platform 114 located just above outlet opening 113 and also is provided with a handling opening 115. A lead weight 116 provided with a handling opening 117 rests on platform 114 and serves to hold the fuel assembly 61 down in the reactor core 29. It is apparent that the fuel assembly 61 comprises four separable sections, a beryllium cylinder and poison rod assembly 99, a thimble 90, a lead weight 116 and a fuel tube bundle 86.

Figure 13:
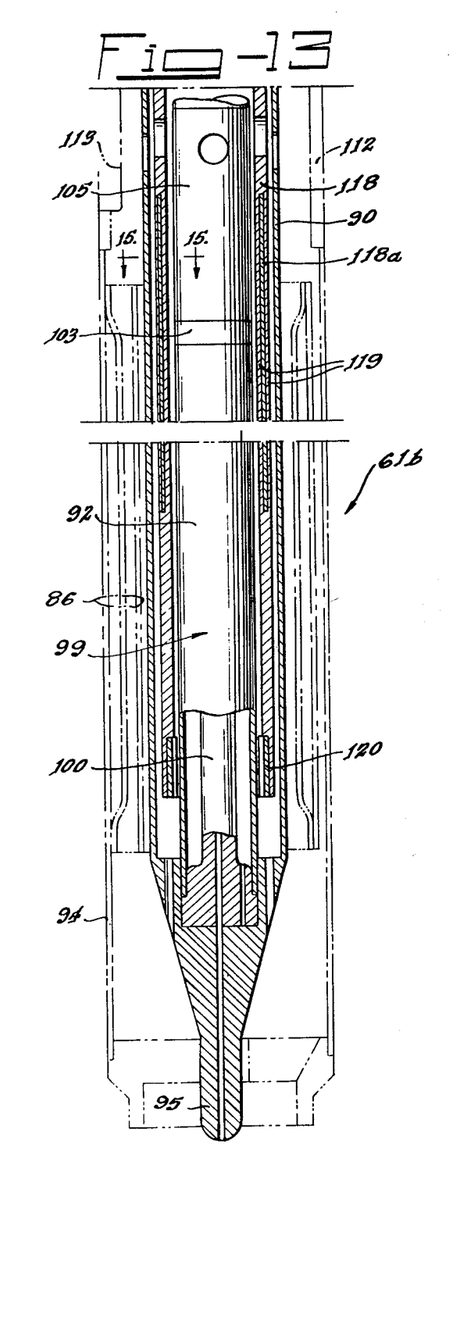
FIG. 13 is a vertical sectional view of the lower portion of a safety and regulating rod.
Figure 14:
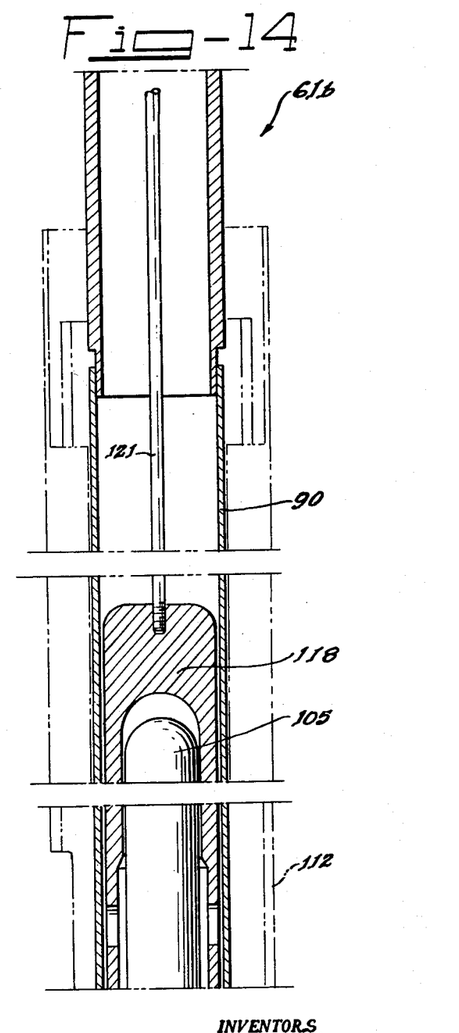
FIG. 14 is a vertical sectional view of the upper portion of a safety and regulating rod.

There are seven fuel and control assemblies 61b in the reactor constructed as shown in FIGS. 13, 14, and 15. Assemblies 61b include, in addition to fuel tube bundle 86, thimble 90, and assembly 99, a $1^{7}/_{16}$-inch O.D. cylinder 118 of 0.040-inch thick cadmium 118a, 24 inches long, encased in a protective corrosion-resistant metal jacket 119, which serves as a control rod. Six of these control rods 118 are arranged in two banks of three each. These serve as safety rods in the reactor. One group of safety rods moves in a vertical plane to the left of and parallel to a line passing from the center of the high-level converter plate 30 through the center of the reactor core 29 to the center of the low-level converter plate 31. The second group of safety rods moves in another vertical plane similarly positioned to the right of the above line. Both groups of safety rods move up or down along the axes of respective fuel tube bundles 86 spaced equidistant from the line previously mentioned. The seventh fuel and control assembly 61b is located on the axis of the reactor core and serves as the regulating rod. Whereas the safety rods are equipped with electromagnetic clutches so that each group of three may be quickly dropped to its in position from any point in its path, the regulating rod may be accurately set anywhere between its extreme positions and may be moved up or down as desired. The control rods 118 are provided at their bottom with a guide insert 120 which serves to properly space the control rod from the burnable-poison element. The control rods 118 are raised and lowered by means of control shafts 121, control rod cables 122 and motors 123 shown in FIG. 1. Each safety and regulating rod is designed to suppress between 1% and 2% $\Delta k/k$. The two groups of safety rods will thus be able to cancel from 6% to 12% $\Delta k/k$. The regulating rod is designed to provide control for approximately 2% $\Delta k/k$.

FIGS. 2 and 5 show the startup sources tube and rabbit facility 124. The upper branch of this U-shaped tube constitutes a test location for samples designed to have extremely short exposures. Samples are directed inwardly into the branch against a stop (not shown) pneumatically and removed in the same way. The lower branch of this uranium tube contains an antimony-beryllium neutron source (also not shown). The source assembly is arranged so that it is securely held with its center at its nearest point of tangency to the periphery of the reactor core.

In operation, deionized light water is forced into plenum chamber 68 through inlet pipe 71. The water is distributed to assemblies 61a and 61b flowing upwardly through nozzles 96, through spider 95 and then between and through fuel tubes 84. The water leaves the fuel assembly through outlet opening 113, passing into reactor vessel 27. The water level in reactor vessel 27 is maintained at a height approximately two feet above the top of the reactor core by means of the water level bubbler 79 previously described. Around the sides of the core the water thickness varies from 4½ inches on the high-level side to 25½ inches on the low-level side. Water is pumped from reactor vessel 27 through water outlet pipe 73. Water also enters thimble 90 through apertures 98 and passes upwardly between assembly 99 and thimble 90 to the top of the fuel assembly. Water also passes up through aperture 101 to cool the burnable-poison rod 93 as previously described. The reactor is designed to operate at a maximum power of the order of 200 kw.

In addition to the separate gas lines whereby the reactor vessel 27 and the drum 62 are pressurized with helium, an additional helium system (not shown) places a low helium pressure on the graphite in the graphite reflector 26. Attenuator 46 comprises a chamber which is filled with a solution of boric acid in water. The concentration of boron in this solution may be changed to change the neutron flux striking the converter plate 31 on the low-exposure side of the reactor. The graphite block 47 on the high-exposure side of the reactor may be removed to provide a moderate sized volume where, at full power operation, a flux of about $10^{11}$ thermal neutrons/sec./cm.$^2$ may be made available.

Operation of the facility should be apparent from the foregoing description. Moderation of the neutrons in the reactor is accomplished by the water within and surrounding the fuel assemblies 61 in conjunction with the beryllium cylinders 91 and the graphite contained in drum 62. The thermal neutrons produced thereby strike converter plates 30 and 31 where they cause fissions in the $U^{235}$ contained therein which penetrate the high-dose and low-dose rooms 21 and 22 through apertures 24 and 25. The curvature of the arc of the converter plates and of the face of the graphite reflector 26 is such that a uniform flux is delivered to the converter plate across its entire length, thereby creating a uniform flux in the experimental areas. The flux in the high-exposure room is approximately $10^5$ higher than it is in the low-exposure room. When it is desired to enter rooms 21 or 22, plates 30 and 31 may be dropped into shielded pockets 32 or 33, respectively, and shutters 36 or 37 lowered into position in front of apertures 24 or 25. Shutters 36 and 37 are massive shields of neutron-moderating and absorbing and gamma-ray-absorbing materials. These shutters serve to prevent entrance of fission and thermal neutrons from the reactor into the irradiation rooms. There are three segments to the shutters for each irradiation room, a center segment and one flanking either side of the center. The three segments may be raised together or the two outside segments may be kept down while the center one is raised. When the shutter is down and the converter plate is in the shielded pocket, the radiation level in the exposure room is such that it may be entered.

Advantages of the novel core and fuel element will next be described. Because the fuel is in the form of tubes, the control rods have more worth than they would if the fuel were in plates, as it is in most reactors. Likewise, the burnable poison has more worth since it is placed on the axis of the fuel assembly. The beryllium cylinder together with the startup source assure a large supply of neutrons in the reactor at all times after fission products have accumulated. These arise from the photoneutron reaction of gamma rays from the fission products on the beryllium. Because of this photoneutron source in the reactor, startup procedures are rapid because it is not necessary to start up from a very low level of reactivity using very sensitive control equipment. This is particularly desirable for a research reactor. The graphite particles in drum 62 provide a flux which is high enough so that instrument holes can be located outside of the core, thereby simplifying the construction of the core. The presence of this graphite also provides a negative temperature coefficient for the reactor.

It will be understood that this invention is not to be limited to the details given herein but that it may be modified within the scope of the appended claims.

What is claimed is:

1. A fuel assembly for a nuclear reactor comprising a plurality of spaced concentric fuel tubes containing highly enriched uranium, a cylindrical aluminum thimble disposed in said fuel tubes, a beryllium cylinder disposed in said thimble, a boron-aluminum rod disposed in said beryllium cylinder, and means for passing water through and between the fuel tubes.

2. A core for a nuclear reactor comprising a cylindrical vessel containing finely divided graphite particles, a plurality of vertically-disposed, cylindrical fuel assemblies disposed in ordered arrangement on concentric circles about a central fuel assembly in said cylindrical vessel, said fuel assemblies comprising a plurality of spaced concentric fuel tubes containing highly enriched uranium, a cylindrical aluminum thimble disposed in said fuel tubes, a beryllium cylinder disposed in said thimble, a boron-aluminum rod disposed in said beryllium cylinder, and means for passing water through and between the fuel tubes.

3. A core for a nuclear reactor according to claim 2 wherein certain of the fuel assemblies include control cylinders movable axially of the fuel assembly between the beryllium cylinder and the aluminum thimble.

References Cited by the Examiner
UNITED STATES PATENTS

| | | | |
|---|---|---|---|
| 2,780,596 | 2/57 | Anderson | 176—58 |
| 2,921,007 | 1/60 | Spinrad | 176—44 |
| 2,926,127 | 2/60 | McCorkle | 176—83 |
| 2,961,392 | 11/60 | Wigner | 176—41 |
| 2,977,297 | 3/61 | Evans et al. | 176—81 |
| 2,984,613 | 5/61 | Bassett | 176—83 |
| 2,987,458 | 6/61 | Breden et al. | 176—73 |
| 2,992,981 | 7/61 | Thompson et al. | 60—108 |
| 3,009,869 | 11/61 | Bassett | 176—83 |

OTHER REFERENCES

The Reactor Handbook, vol. 3, 1955, pages 55 and 80.

CARL D. QUARFORTH, *Primary Examiner.*

OSCAR R. VERTIZ, *Examiner.*